United States Patent
Koo et al.

(10) Patent No.: US 9,513,730 B2
(45) Date of Patent: Dec. 6, 2016

(54) CONDUCTIVE SUBSTRATE AND TOUCH PANEL COMPRISING SAME

(75) Inventors: Beom Mo Koo, Daejeon (KR); Jaehoon Shim, Daejeon (KR); Song Ho Jang, Daejeon (KR); Jin Woo Park, Daejeon (KR); Ji Young Hwang, Daejeon (KR); Je Seob Park, Seoul (KR)

(73) Assignee: LG Chem, Ltd., Seoul (KR)

( * ) Notice: Subject to any disclaimer, the term of this patent is extended or adjusted under 35 U.S.C. 154(b) by 352 days.

(21) Appl. No.: 14/118,162

(22) PCT Filed: May 16, 2012

(86) PCT No.: PCT/KR2012/003847
§ 371 (c)(1),
(2), (4) Date: Nov. 15, 2013

(87) PCT Pub. No.: WO2012/161462
PCT Pub. Date: Nov. 29, 2012

(65) Prior Publication Data
US 2014/0085551 A1 Mar. 27, 2014

(30) Foreign Application Priority Data
May 20, 2011 (KR) .................. 10-2011-0048170

(51) Int. Cl.
*G06F 3/041* (2006.01)
*G06F 3/044* (2006.01)
*G06F 3/045* (2006.01)

(52) U.S. Cl.
CPC ............ *G06F 3/041* (2013.01); *G06F 3/044* (2013.01); *G06F 3/045* (2013.01); *G06F 2203/04103* (2013.01); *G06F 2203/04112* (2013.01); *Y10T 428/24802* (2015.01); *Y10T 428/24868* (2015.01); *Y10T 428/24917* (2015.01)

(58) Field of Classification Search
CPC ............... Y10T 428/24802; Y10T 428/24355; Y10T 428/24851; Y10T 428/24868
See application file for complete search history.

(56) References Cited

U.S. PATENT DOCUMENTS

2009/0002337 A1 1/2009 Chang
2009/0284475 A1 11/2009 Nashiki et al.

FOREIGN PATENT DOCUMENTS

| CN | 101263564 A | 9/2008 |
| JP | 2009-003518 A | 1/2009 |
| JP | 20099574 A | 1/2009 |

(Continued)

OTHER PUBLICATIONS

Wood, R., "The Invisibility of Transparent Objects", Phys. Rev., 1902, vol. 15, p. 123-124.*

*Primary Examiner* — Gerard Higgins
(74) *Attorney, Agent, or Firm* — Dentons US LLP

(57) ABSTRACT

The invention relates to a conducting substrate and a touch panel comprising the same. A conducting substrate according to one embodiment of the invention comprises at least one base material and at least one conductive pattern on the base material, wherein the arithmetic average roughness height (Ra) of the surface of the conductive pattern is 0.1-0.3 μm. The conducting substrate and the touch panel comprising the same do not obstruct the view, have excellent conductivity, and can reduce the intensity of a diffraction pattern caused by reflected light.

18 Claims, 10 Drawing Sheets

(56) References Cited

FOREIGN PATENT DOCUMENTS

| | | | |
|---|---|---|---|
| JP | 2009053894 | A | 3/2009 |
| JP | 2010-257205 | A | 11/2010 |
| JP | 2011-039597 | A | 2/2011 |
| KR | 10-0954894 | B1 | 4/2010 |

* cited by examiner

Figure 6

| | Example | Comparative Example |
|---|---|---|
| Surface roughness (Ra) | 0.24 μm | 0.03 μm |
| Transmission-type diffraction | | |
| Reflection-type diffration | | |

CONDUCTIVE SUBSTRATE AND TOUCH PANEL COMPRISING SAME

This application is a National Stage Entry of International Application No. PCT/KR2012/003847, filed on May 16, 2012, and claims the benefit of Korean Patent Application No. 10-2011-0048170, filed on May 20, 2011, each of which are hereby incorporated by reference in their entirety for all purposes as if fully set forth herein.

TECHNICAL FIELD

The present application claims priority of Korean Patent Application No. 10-2011-0048170 filed in the Korean Intellectual Property Office on May 20, 2011, which is incorporated herein by reference in its entirety.

The present invention relates to a conducting substrate and a touch panel comprising the same.

BACKGROUND ART

In general, a display apparatus refers collectively to TV's or computer monitors, etc. and includes a display device for displaying images and a housing for holding the display device.

Display devices include, for example, a plasma display panel (PDP), a liquid crystal display (LCD), an electrophoretic display, a cathode-ray tube (CRT), and an organic light emitting diode (OLED) display. A display device has RGB pixel patterns and optical filters.

The optical filter may comprise at least one of the following elements: an anti-reflection film for preventing external incident light from being reflected toward the outside; a near-infrared ray blocking film for blocking the emission of near-infrared rays generated in the display device in order to prevent erroneous operation of a device such as a remote controller; a color compensation film including a color control dye which controls the color tone to enhance color purity; and an electromagnetic wave shielding film for shielding electromagnetic waves generated in the display device during the operation of the device. Here, the electromagnetic wave shielding film includes a transparent base material and metal mesh patterns on the base material.

Meanwhile, with the rapid popularization of electronic devices such as smart phones, tablet PCs, and internet protocol televisions (IPTVs), there is an increasing need for a touch function to input information by hand without using a special input device such as a keyboard or a remote controller. In addition, there is a need for a multi-touch function to recognize specific points and to write information.

Touch panels having the above-mentioned functions can be divided according to a signal detection method into the following types: a resistive-type touch panel which senses a pressed position based on a change in an electric current or voltage value in a state in which DC voltage is applied; a capacitive-type touch panel which utilizes a capacitance coupling in a state in which AC voltage is applied; and an electromagnetic-type touch panel which senses a selected position based on a change in voltage in a state in which a magnetic field is applied.

Among these touch panels, the most popularized resistive-type and capacitive-type touch panels employ a transparent conductive film such as an ITO film to recognize a touch by electrical contact or based on a change in capacitance. However, the transparent conductive film generally has a high resistance of 150 ohms per square or more, and thus the sensitivity of the touch panel comprising the conductive film decreases as the size thereof becomes larger. In addition, an increase in the size of the touch screen leads to a rapid increase in the cost of the ITO film. These problems make it difficult to commercialize these touch panels. In an attempt to overcome these problems, the use of highly conductive metal patterns to realize large-sized touch panels has been proposed.

DISCLOSURE

Technical Problem

In the art to which the present invention pertains, there is a need for not only studies on touch panels capable of employing highly conductive metal patterns, but also studies on touch panels whose sensitivity is not reduced even when the size of the touch panels is increased.

Technical Solution

An exemplary embodiment of the present invention provides a conducting substrate, which comprises at least one base material and at least one conductive pattern provided on the base material, wherein the arithmetic average roughness height (Ra) of the surface of the conductive pattern is 0.1-0.3 µm.

Another exemplary embodiment of the invention provides a touch panel comprising said conducting substrate.

Advantageous Effects

In the conducting substrate according to the embodiment of the present invention and the touch panel comprising the same, diffuse reflection can be induced by controlling the surface roughness of the conductive pattern, and thus the intensity of light diffraction patterns caused by external light can be reduced. In addition, the conducting substrate of the present invention can be applied not only to a conductive structure comprising an irregular pattern such as a Voronoi pattern and a darkening layer, but also to a touch panel comprising the same, in order to prevent the Moiré phenomenon and maximize the masking effect.

The conductive pattern according to the embodiment of the invention can be formed by various methods, such as a printing method, a photolithography method, a photography method, a hard mask-based method, a sputtering method, an ink jet imprinting method or an imprinting method, after predetermining a desired pattern. Thus, it can be formed by an easy process in a cost-effective manner.

When the conductive pattern according to the embodiment of the present invention is used, the irregularity and light transmittance thereof can be controlled by artificially irregularities and pitches during the design thereof. In addition, even though the conductive pattern according to the present invention is an irregular pattern, the density of lines per unit area of the conductive pattern of the present invention is similar to that of a regular pattern having uniform pitches, making it possible to ensure electrical uniformity similar to the regular pattern.

DESCRIPTION OF DRAWINGS

FIG. 6 shows the results of observation of diffraction phenomena on a touch panel according to one embodiment of the present invention and on a touch panel according to the prior art.

MODE FOR INVENTION

Figure 1:
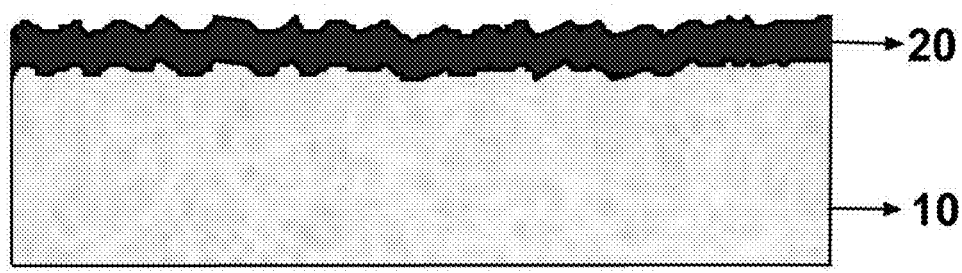
FIGS. 1 to 4 show a conducting substrate according to one embodiment of the present invention.

Hereinafter, the present invention will be described in detail.

The present invention is directed to a conducting substrate and a touch panel comprising the same. More particularly, the present invention is directed to a conducting substrate comprising a pattern capable of reducing reflected diffraction patterns caused by external light, and to a touch panel having the conducting substrate.

As discussed above, when a display apparatus comprises an electromagnetic wave shielding film or a touch panel, which comprises a metal pattern, this film or touch panel causes interference with the pixel pattern or electrode pattern of the display apparatus or with the pattern structure of other optical films, thus causing the Moiré phenomenon. As used herein, the term "Moiré" refers to an interference pattern created when two or more regular patterns overlap each other.

In the plasma display panel (PDP), for example, the Moiré phenomenon can occur, because the pixel pattern of the plasma display panel coexists with the electromagnetic shielding metal mesh pattern of the optical filter. For this reason, after the specification of plasma display panels was determined, preventing the Moiré phenomenon by, for example, designing the angle of the metal mesh pattern of the optical filter, is generally attempted.

As described above, in order to prevent the Moiré phenomenon, the line width, pitch and angle of the electromagnetic shielding metal mesh patterns are controlled. However, in this case, the patterns should be changed depending on the display size and the pixel formation method.

In particular, in recently developed LCD display panels, finer pixel patterns are used in order to realize high resolution, and different types of models are applied to the corresponding products. For this reason, it is difficult to make products using one consistent Moiré-avoidance design determined by controlling the line width, pitch and angle of existing patterns.

In addition, these days, the application of display devices products that emphasize lightweight and portable characteristics is gradually increasing. Thus, in the case of components such as touch screens, which are applied to display apparatuses, it is required to minimize the reflection of external light (point light source type) when the product is used outside or in an environment in which straight light (LED illumination) exists. In addition, in the case of patterned optical components, diffraction patterns of reflected light caused by a point light source occur, and thus another solution to control this phenomenon is required.

The present invention provides a conducting substrate comprising a pattern, in which the pattern does not obstruct the view, has excellent conductivity and can prevent not only the Moiré phenomenon from occurring, but also a secondary diffraction phenomenon from occurring when light from a point light source is reflected on the display surface. The present invention also provides a touch panel comprising said conducting substrate.

A conducting substrate according to one embodiment of the present invention may include at least one base material and at least one conductive pattern provided on the base material.

The conducting substrate according to the embodiment of the present invention may include a first base material, a first conductive pattern provided on the first base material, a second base material provided on the first conductive pattern, and a second conductive pattern provided on the second base material.

The conducting substrate according to the embodiment of the present invention comprises the conductive pattern which is not a conductive layer formed on the entire surface. Thus, it can prevent the Moiré phenomenon from occurring and can also prevent a secondary diffraction phenomenon from occurring when light from a point light source is reflected on the display surface. In addition, it does not include an air gap which causes the phenomenon of Newton's rings.

Preferably, the surface of the conductive pattern has an arithmetic average roughness height (Ra) of 0.1-0.3 µm. More preferably, the arithmetic average roughness height (Ra) of the surface of the conductive pattern is 0.15-0.25 µm. When the arithmetic average roughness height (Ra) is 0.1 µm or more, a diffuse reflection effect can be obtained, and when it is 0.3 µm or less, it is possible to prevent the Haze value from being increased due to the diffuse reflection effect. If the arithmetic average roughness height (Ra) is greater than 0.3 µm, fine air spaces can occur when an adhesive layer is formed on the conductive pattern, resulting in an increase in the Haze value.

Figure 13:
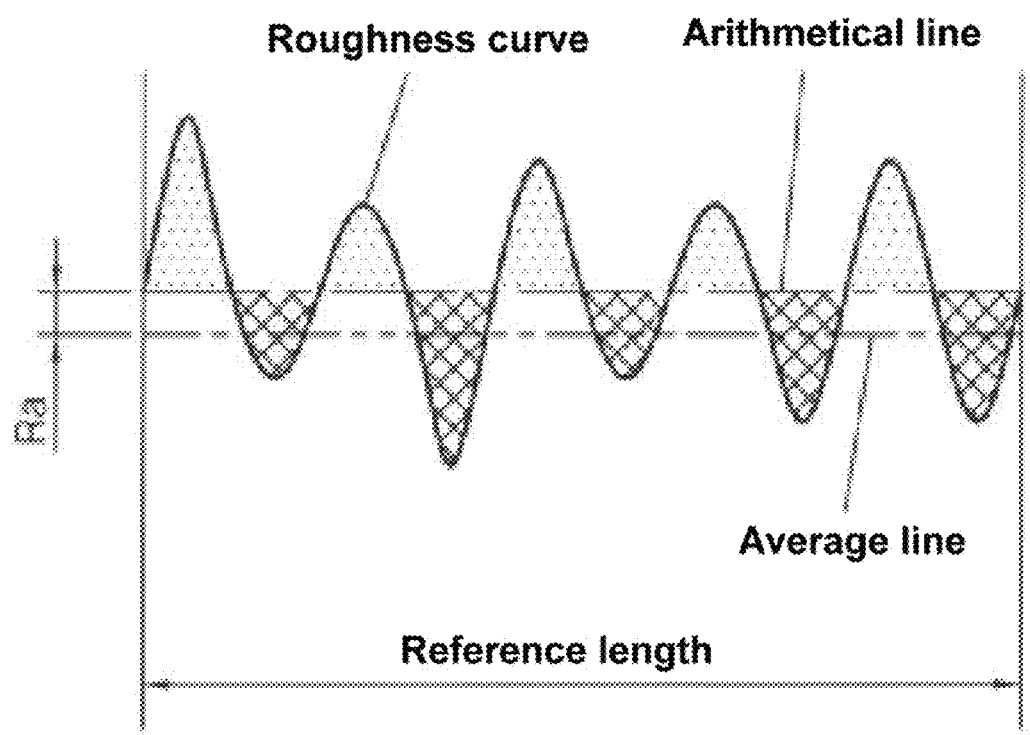
FIG. 13 schematically shows a roughness curve.

As used herein, the term "arithmetical average roughness" means the average value of deviation of all the peaks and valleys deviating from the average line throughout the reference length in the roughness curve. The roughness curve is obtained by the cutoff of a cross-sectional curve, and the cross-sectional curve refers to a concave and convex profile appearing in the cross-section of a surface roughness-measuring object and is generally measured in the direction in which the concave and convex portion is the largest. Specifically, as shown in FIG. 13, the geometrical line corresponding to the profile of the object in the roughness curve is defined as the average line, and arithmetical line means a theoretical line established such that the sum of the areas of all the peaks in the roughness curve is the same as the sum of all the valleys.

According to one embodiment of the present invention, the arithmetic average roughness height (Ra) of the base material may be 0.1-0.3 µm. The arithmetic average roughness height (Ra) of the base material can be obtained by treating the surface of the base material. The treatment of the surface of the base material can be performed using methods known in the art, and the surface roughness of the base material can be controlled to a size of submicron by removing molecules from the surface of the base material.

According to another embodiment of the present invention, the conducting substrate can be formed on one or both surfaces of the base material.

According to another embodiment of the invention, the conducting substrate may further comprise a coating layer between the base material and the conductive pattern, wherein the arithmetic average roughness height (Ra) of the coating layer may be in the range of 0.1 to 0.3 μm.

According to another embodiment of the invention, the conducting substrate may further comprise a coating layer between the base material and the conductive pattern, wherein the interface between the coating layer and the conductive pattern may have an arithmetic average roughness height (Ra) of 0.1-0.3 μm. In this case, the surface of the coating layer, excluding the portion that comes into the conductive pattern, may have no roughness.

In one embodiment of the invention, the coating layer may be formed on the entire portion of one or both surface of the conductive pattern so as to provide a pattern having the same shape as the conductive pattern. Alternatively, it may also be formed on at least a portion of one or both surface of the conductive pattern or formed over an area larger than that of the conductive pattern.

In one embodiment of the invention, the coating layer is preferably an anti-reflection layer, but it is not limited thereto. For example, after the coating layer such as UV resin has been formed on the entire surface, it may be provided with roughness using a mold having roughness.

In one embodiment of the invention, a coating layer for the anti-reflection layer may comprise a binder resin, organic or inorganic particles, and a solvent, or may further comprise various additive agents, including a UV curing initiator, a leveling agent, a wetting agent and a defoaming agent.

In one embodiment of the invention, the dry thickness of the coating layer may be in the range of 1 to 20 μm. When the thickness of the coating layer is 1-20 μm, a surface having an arithmetic average roughness height (Ra) of 0.1 to 0.3 μm can be effectively obtained.

In one embodiment of the invention, the coating layer preferably has a pencil hardness of H-6H, more preferably 2H-4H, and even more preferably 3H.

In one embodiment of the invention, the conducting substrate may further comprise an adhesive layer on the conductive pattern. The adhesive layer can be formed in contact with the surface of the conductive pattern that is opposite the surface coming into contact with the base material. The adhesive layer may include an optical clear adhesive (OCA).

In one embodiment of the invention, the conducting substrate may have a structure of base material/conductive pattern/adhesive layer, or base material/coating layer/conductive pattern/adhesive layer, or first base material/first conductive pattern/adhesive layer/second base material/second conductive pattern/adhesive layer, or first base material/coating layer/first conductive pattern/adhesive layer/second base material/coating layer/second conductive pattern/adhesive layer, but is not limited thereto.

The adhesive layer may be formed to cover both the coating layer and the conductive pattern. Herein, the adhesive layer does not differ from the coating layer in terms of the physical properties, and thus the adhesive layer can offsets the concave and convex portion of surface of the coating layer in an interface between the adhesive layer and the coating layer. In this case, the concave and convex portion of the surface of the coating layer that comes into contact with the adhesive layer is masked while leaving the concave and convex portion of the interface between the coating layer and the conductive pattern and the concave and convex portion of the interface between the conductive pattern and the adhesive layer.

Also, the difference in refractive index between the adhesive layer and the coating layer may be 0.2 or less. When the difference in refractive index between the adhesive layer and the coating layer may be 0.2 or less, the view is not obstructed even when the interface between the adhesive layer and the coating layer has roughness. This is because the two layers have similar refractive indices.

In addition, the difference in refractive index between the adhesive layer and the base material may also be 0.2 or less. In this case, the view is not obstructed.

Moreover, the arithmetic average roughness height (Ra) of the interface between the coating layer and the conductive pattern may be in the range of 0.1 to 0.3 μm. Also, the arithmetic average roughness height (Ra) of the interface between the conductive pattern and the adhesive layer may be in the range of 0.1 to 0.3 μm.

If a transparent conductive layer (ITO, etc.) is formed on the base material as in the prior art, there is a problem in that resistance significantly increases in proportion to transmissivity. Also, if a conductive pattern formed of one or more regular patterns, such as a grid pattern or a linear pattern, is included in a display having a regular internal structure (e.g., pixel structure) or a display including an optical film or electrode structure having a regular pattern, the relative interference between the patterns occurs due to a light source near the pattern structure, causing the Moiré phenomenon which reduces visibility.

In the case in which this optical film or electrode structure having a regular pattern is mounted in provided in a display, diffraction can occur due to the regularity of the pattern, if external light is light from a point light source. Thus, it can be seen that the pattern regularity induces the Moiré phenomenon and reflection-type diffraction. This problem can be solved according to the present invention by increasing the surface roughness of a conductive pattern to induce diffuse reflection, thereby preventing the Moiré phenomenon and reflection-type diffraction from occurring.

As used for the conducting substrate according to the embodiment of the invention, the term "point light source" may be used interchangeably with the term "straight light source" or "parallel light source". Herein, the point light source is preferably a visible light source, and thus it may be a light emitting diode (LED) illumination, a laser light source, etc., which mainly have a visible wavelength of 550 nm.

According to one embodiment of the invention, the conductive pattern may be either a regular pattern or an irregular pattern.

In one embodiment of the invention, the conductive pattern may be formed of, in addition to straight lines, various lines, including curved lines, zigzag lines, waveform lines, and combinations of two or more of these lines.

Figure 8:
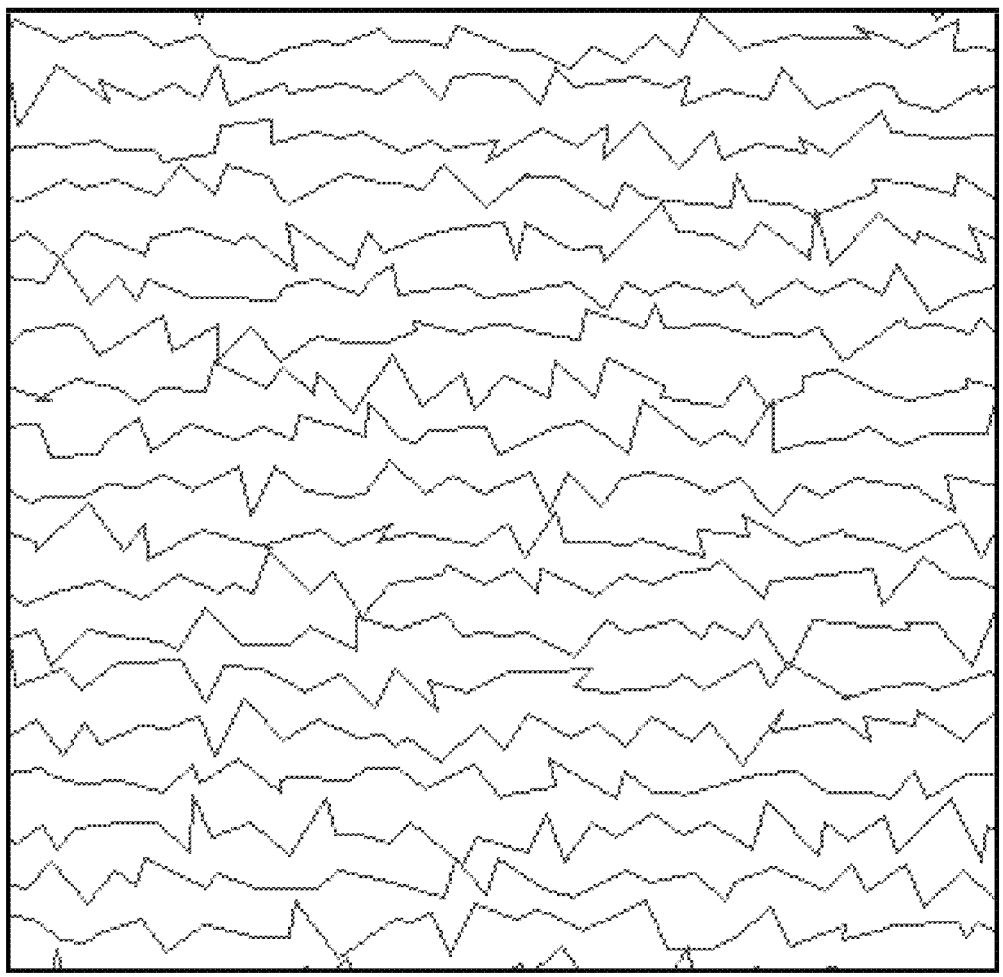
FIG. 8 illustrates a conductive pattern having any linear shape according to one embodiment of the present invention.
Figure 9:
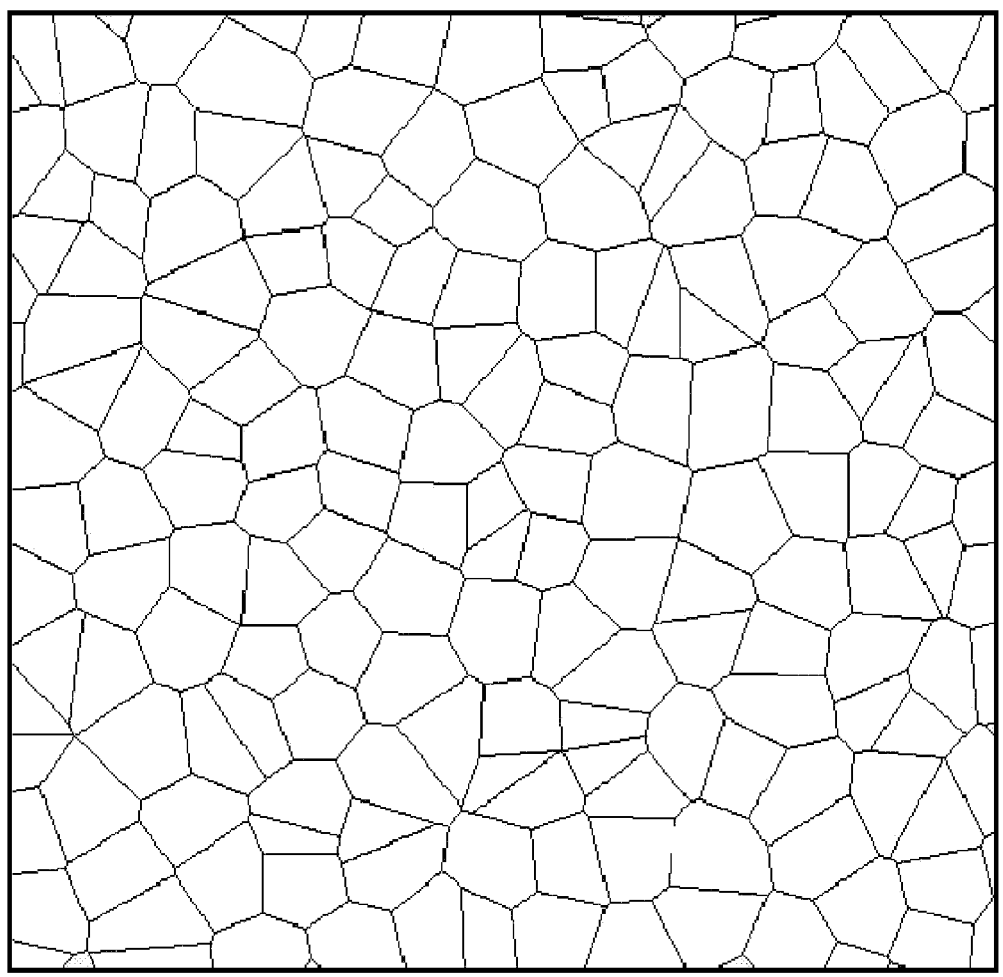
FIG. 9 illustrates a conductive pattern having any closed curve shape according to one embodiment of the present invention.

FIGS. 8 and 9 show conductive patterns according to embodiments of the invention, but the scope of the present invention is not limited thereto. FIG. 8 shows a one-dimensional pattern in which pattern lines do not cross each other, and FIG. 9 shows a two-dimensional pattern in which pattern lines cross each other to form closed figures in at least a portion of the pattern. However, the scope of the present invention is not limited thereto.

Figure 10:
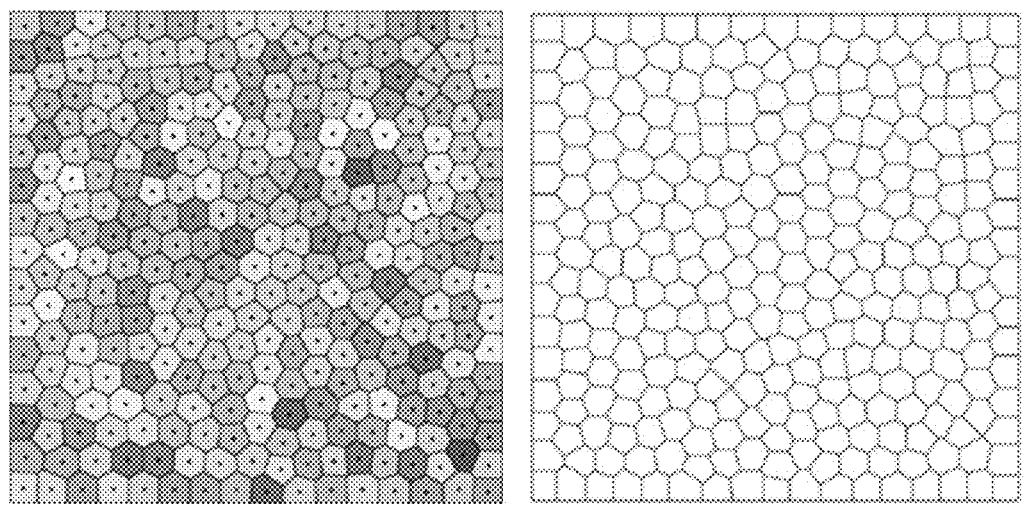
FIG. 10 illustrates a conductive pattern formed using a Voronoi diagram generator according to one embodiment of the present invention.
Figure 11:
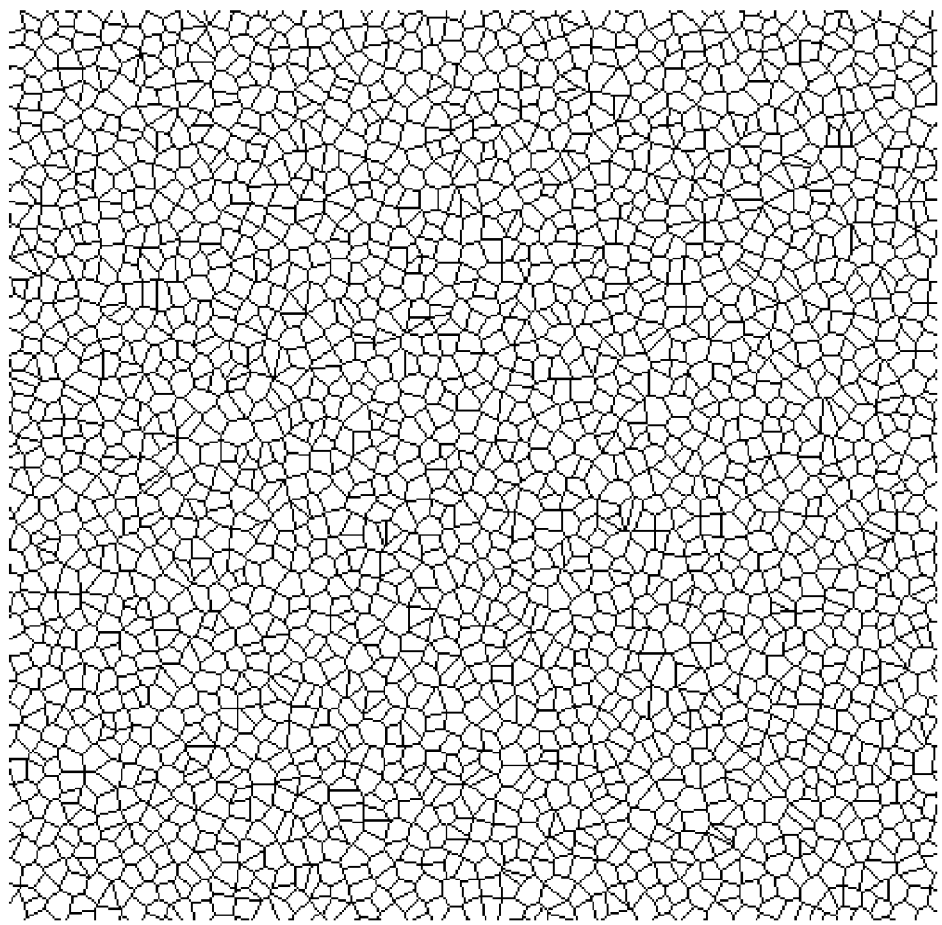
FIG. 11 illustrates a conductive pattern according to one embodiment of the present invention.
Figure 12:
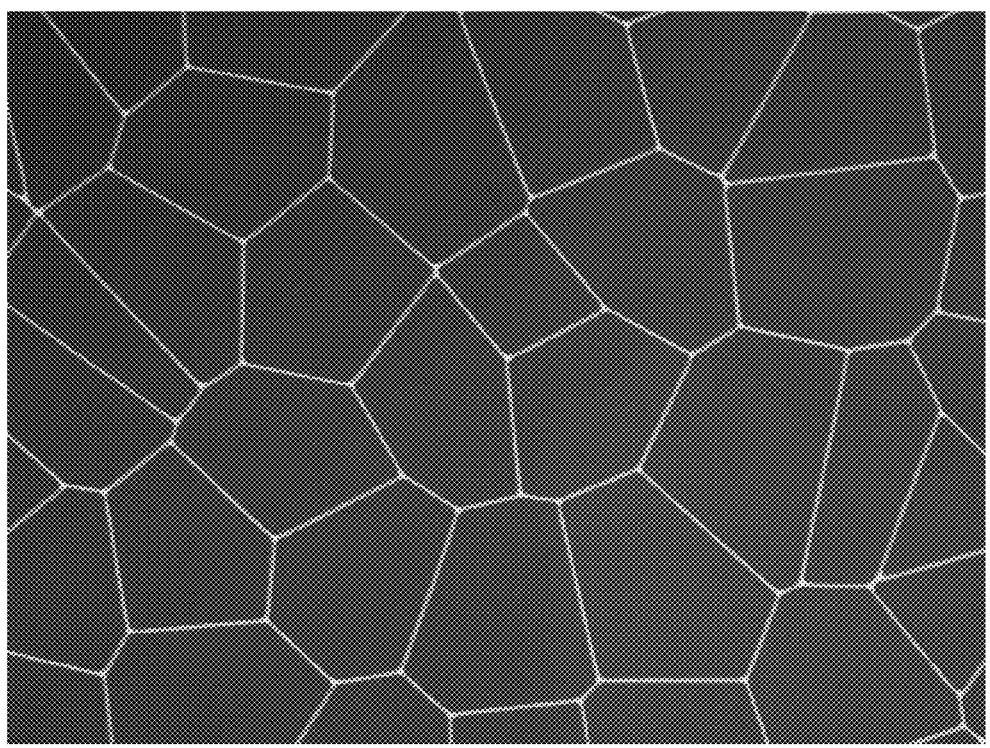
FIG. 12 illustrates a Voronoi pattern formed using a reverse offset indirect printing process according to one embodiment of the present invention.

In one embodiment of the invention, the conductive pattern may have the shape of the boundary between figures forming a Voronoi diagram. In the present invention, the conductive pattern may be formed in the shape of the boundary between figures that configure the Voronoi diagram, thereby preventing the Moiré phenomenon from occurring and a secondary diffraction phenomenon from occurring due to reflected light. The Voronoi diagram is a pattern that is formed by filling the area closest to the corresponding point as compared to the distance of each point from the other dots if Voronoi diagram generator points are disposed in the desired area to be filled. For example, when large discount stores in the whole country are represented by dots and consumers find the closest large discount store, the pattern that displays the commercial area of each discount store may be exemplified. That is, if the space is filled with a regular hexagon and each dot of the regular hexagon is set by the Voronoi generator, the conductive pattern may be a honeycomb structure. In the present invention, when the conductive pattern is formed using the Voronoi diagram generator, there is an advantage in that it is possible to easily determine a complex pattern shape which can prevent the Moiré phenomenon from occurring due to interference with other regular patterns. FIG. 10 illustrates a pattern formed using the Voronoi diagram generator.

In the present invention, the pattern derived from the generator can be by regularly or irregularly disposing the Voronoi diagram generator. Even in the case in which the conductive pattern is formed in the shape of the boundary between figures which forms the Voronoi diagram, regularity and irregularity can be properly harmonized with each other when the Voronoi diagram generator is produced, in order to solve the above-mentioned visibility-associated problem. For example, the Voronoi pattern may be formed by designating an area having a predetermined size as a basic unit in the area, into which the pattern is to introduced, and generating points such that the distribution of the points in the basic unit is irregular. The use of this method makes it possible to prevent the distribution of lines from being localized toward any one point, thereby improving visibility.

As described above, when the opening ratio of the pattern is kept constant per unit area in order to ensure uniform conductivity and visibility, the number of Voronoi diagram generators per unit area can be controlled. When the number of Voronoi diagram generators per unit area is controlled uniformly, the unit area is preferably 5 cm² or less, and more preferably 1 cm² or less. The number of the Voronoi diagram generators per unit area is preferably 5-5,000/cm² or less, and more preferably 100-2,500/cm².

Preferably, at least one of the figures forming the pattern in the unit area has a shape different from that of other figures.

In one embodiment of the invention, the conductive pattern may comprise a border structure of closed figures connected continuously to each other and may not comprise the closed figures having the same shape in a predetermined unit area (1 cm×1 cm), and the number of vertexes of the closed figures may differ from the number of vertexes in the same number of quadrangles as the closed figures.

In the conducting substrate according to the present invention, the number of vertexes of the closed figures differs from the number of vertexes in the same number of the quadrangles as the closed figures. More specifically, the number of vertexes of the closed figures may be larger than or 1.9 to 2.1 times larger than the number of vertexes in the same number of the quadrangles as the closed figures, but is not limited thereto.

In one embodiment of to the present invention, the closed figures are continuously connected to each other, and for example, in the case in which the closed figures are polygonal, the adjacent closed figures may have a shape sharing at least one side.

In one embodiment of the present invention, the conductive pattern may comprise a border structure of closed figures continuously connected to each other and may not comprise the closed figures having the same shape in a predetermined unit area (1 cm×1 cm), and the number of vertexes of the closed figures may differ from the number of vertexes of polygons formed by connecting the shortest distances between the centers of masses of the closed figures.

The number of vertexes of the closed figures differs from the number of vertexes of the polygons formed by connecting the shortest distances between centers of mass of the closed figures. More specifically, the number of vertexes of the closed figures may be larger than or 1.9 to 2.1 times larger than the number of vertexes of the polygons formed by connecting the shortest distances between the centers of masses of the closed figures, but is not limited thereto.

In one embodiment of the present invention, the conductive pattern of the conducting substrate comprises a border structure of closed figures continuously connected to each other and does not comprise the closed figures having the same shape in a predetermined unit area (1 cm×1 cm), and the closed figures have a value of the following Equation 1 of 50 or more.

(standard deviation of distances between vertexes/ average of distances between vertexes)×100    [Equation 1]

In one embodiment of the present invention, when an image of a transmission type diffraction pattern is obtained by irradiating one surface of the conductive pattern with straight light from a light source, the image has a value of the following Equation 2 of less than 21.

(standard deviation of strengths of transmission type diffraction pattern according to angle region/ average strength of transmission type diffraction patterns according to angle region)×100    [Equation 2]

In Equation 2 above, the angle region means a region where an angle of 0-360° is divided every 10° from the center of the image of the transmission type diffraction pattern.

When the image of the transmission type diffraction pattern is obtained, the image may have a value of the following Equation 2 of less than 21, 15 or less, or 10 or less.

In one embodiment of the present invention, the conductive pattern comprises the border structure of the continuously connected closed figures, and the border structure of the closed figures may be selected from among a straight line, a curved line, a zigzag line, and combinations thereof, etc.

In one embodiment of the present invention, the conductive pattern may not comprise the closed figures that are the same as each other in the unit area.

In one embodiment of the present invention, the electric conducting pattern comprises the border structure of the continuously connected closed figures, and when the angles of lines of a border of the closed figures relative to any straight line are divided from 0 to 180° in a unit of 10°, the value of the following Equation 3 may be less than 21, 15 or less, or 10 or less with respect to the number of lines belonging to each angle range.

(standard deviation of numbers of lines corresponding to angle range/average of numbers of lines corresponding to angle range)×100    [Equation 3]

In one embodiment of the present invention, the values of Equations 1 to 3 may be calculated in the unit area of the conductive pattern. The unit area may be an area where the conductive pattern is formed. For example, it may be 3.5 cm×3.5 cm or the like, but is not limited thereto.

In the present invention, the term "vertex" means a point at which lines constituting the border of the closed figures of the conductive pattern cross each other.

A fine conductive pattern required in a touch screen may be realized by forming the pattern as described above. If a fine conductive pattern is not realized in a touch screen, the required physical properties (e.g., resistance) of the touch screen cannot be obtained.

In the case of a touch screen comprising a known metal mesh pattern, a solution to avoid the moiré phenomenon is not basically provided. For this reason, in the present invention, an irregular pattern is applied as the conductive pattern. In this case, a critical value at which the moiré phenomenon does not occur regardless of the display was quantified by determining the occurrence of moiré and the reflective diffraction phenomenon at various irregularities.

In one embodiment of the present invention, the conductive pattern comprises the border structure of the continuously connected closed figures, and the number of vertexes of the closed figures differs from the number of vertexes in the same number of quadrangles as the closed figures.

In the one embodiment of the present invention, the conductive pattern comprises the border structure of the continuously connected closed figures, and the number of vertexes of the closed figures differs from the number of vertexes of polygons formed by connecting the shortest distances between the centers of the masses of the closed figures.

In another embodiment of the present invention, the conductive pattern comprises the border structure of the continuously connected closed figures, and the closed figures have a value of Equation 3 of 50 or more.

The another embodiment of the present invention may have the shape of the border structure of the closed figures obtained by disposing predetermined points in regularly arranged unit cells, and then connecting the points to the points closest thereto as compared to the distances from other points.

In this case, when irregularity is introduced into the manner in which predetermined points are disposed in the regularly arranged unit cells, the conductive pattern according to the present invention can be formed. For example, in the case where irregularity is provided as 0, if the unit cell is a square, the conductive pattern will have a square mesh structure, and if the unit cell is a regular hexagon, the conductive pattern will have a honeycomb structure. That is, the conductive pattern according to the present invention means a pattern where irregularity is not 0.

The irregular pattern shape according to the present invention can suppress localization of lines constituting the pattern, allows uniform transmittance to be obtained from the display, allows the linear density per unit area to be maintained at constant level, and enables uniform conductivity to be ensured.

In one embodiment of the present invention, in the electric conducting pattern, the number of vertexes of the closed figures in the unit area (3.5 cm×3.5 cm) may be 6,000 or more, 7,000 or more, 15,000 or more, and 245,000 or less, and may be determined by a person skilled in the art depending on desired transmittance and conductivity.

In the present invention, when the conductive pattern is formed on a transparent base material by a method described below, the width of lines and height of lines of the conductive pattern can be formed uniform. In one embodiment of the invention, at least a portion of the conductive pattern can be formed such that it differs from other portions of the conductive pattern. This enables a desired conductive pattern to be obtained. For example, when the electrical conductivity of any region is required to be higher than that of other regions or when the touch sensitivity in any region of a touch panel electrode is required to be more sensitive than other regions, the conductive pattern in the region of interest van be designed such that it has a pitch value different that in other regions. In order to make a portion of the conductive pattern different from other portions of the conductive pattern, the width of lines forming the conductive pattern in the portion of interest or the distance between the lines can be made different from that in other portions. For example, in the case of capacitive type touch screens, whether a portion connected to the lateral pad is highly conductive is of great concern.

In one embodiment of the invention, the conducting substrate may comprise a region in which the conductive pattern is not formed.

In one embodiment of the invention, the conductive pattern can be darkened. When a metal material is directly patterned, masking of the resulting pattern lines can be reduced due to the inherent gloss of the metal. This problem can be prevented by darkening the conductive pattern. In the case of forming the conductive pattern by printing a conductive material directly, the conductive pattern can be darkened using a conventional method. Specifically, it can be darkened either by adding a darkening material to a paste or ink for forming the conductive pattern, or by printing and baking the paste or ink, followed by darkening.

Examples of the blackening material that can be added to the paste or ink include metal oxide, carbon black, carbon nanotubes, black pigment, colored glass frit, etc. If the ink or paste is based on Ag, the blackening process following baking can be performed either by dipping the ink or paste into an oxidizing such as an Fe or Cu ion-containing solution, a halogen ion (e.g., chloride ion)-containing solution, or a hydrogen peroxide or nitric acid solution, or by treating the ink or paste with halogen gas.

In the case of the metal material is patterned by etching rather than a direct printing method, the darkening process can be performed by depositing a darkening layer on the surface of the substrate, which is viewed by humans, and depositing thereon a layer for imparting conductivity, and then patterning the layers at the same time by etching. For example, the darkening can be performed by depositing an oxynitride layer such as AlOxNy as a darkening layer; depositing an Al layer thereon, and applying a resist ink to the resulting structure, followed by etching, wherein AlOxNy and Al are simultaneously patterned by a general-purpose etching solution which is a mixed solution of phosphoric acid, nitric acid, acetic acid and water, thereby darkening the conductive pattern.

In order to maximize the effect of preventing the Moiré phenomenon, the conductive pattern can be formed so that the area of the pattern portion consisting of asymmetrical figures is 10% or more of the total pattern area. In addition, the conductive pattern can be formed such that the area of figures, in which the length of at least one of lines formed by connecting the center line of any of figures forming a Voronoi diagram to the center lines of figures adjacent to said figure differs from those of other lines, is 10% or more of the total area of the conductive pattern.

The conductive pattern can be fabricated so as to have a large area by designing patterns in limited areas, and repeatedly connecting the limited areas to each other. Repeatedly connecting the limited areas to each other can be performed by fixing the positions of the points of each side. In order to prevent the Moiré phenomenon from occurring due to regularity, the limited area preferably has an area of 1 cm² or more, and more preferably 5 cm² or more, but these can be selected by a person skilled in the art depending on the desired area of the conductive pattern.

According to one embodiment of the invention, after a desired pattern shape has been determined, a precise conductive pattern having a small line width can be formed on a transparent base material using a printing method, a photolithography method, a mask-based method, a sputtering method, or an inkjet method. The pattern shape can be determined using the Voronoi diagram generator, whereby a complex pattern can be easily determined. As herein, the terms "Voronoi diagram generator" means the points that are disposed so that the Voronoi diagram can be formed as described above. However, the scope of the present invention is not limited thereto, and the desired pattern shape can be determined using other methods.

The printing method can be performed by transferring a paste containing a conductive pattern material onto a transparent base material in a desired shape, then baking the transferred paste. The transferring method is not particularly limited, but the above pattern form is formed on the pattern transferring medium such as an intaglio printing plate or a screen and the desired pattern may be transferred on the transparent substrate by using the pattern form. The method for forming the pattern shape on the pattern transferring medium may be performed using a method known in the art.

The printing method is not particularly limited, and a printing method such as offset printing, screen printing, gravure printing, flexo printing, and inkjet printing may be used, and among them, a combination of these methods may be used. The printing method may use a roll-to-roll method, a roll-to-plate method, a plate-to-roll method, or a plate-to-plate method.

In one embodiment of the present invention, it is desirable to use a reverse offset printing method in order to realize a precise conductive pattern. The reverse offset printing method includes: coating the entire surface of silicon-based rubber (called "blanket") with ink capable of serving as resist during etching; removing an unnecessary portion through a patterned intaglio printing plate, called "Cliché"; transferring the printing pattern remaining in the blanket into a base material (such as a film or glass) having a metal deposited thereon; and baking and etching the resultant structure to form a desired pattern. When this method is used, by using a base material having metal deposited thereon, the uniformity of the line height over the whole area of the conductive pattern can be ensured, and thus the resistance in the thickness direction of the pattern can be maintained uniformly. In addition, in one embodiment of the invention, the desired pattern can be formed using a direct printing method by printing conductive ink (such as Ag ink) directly using the above-described reverse offset printing method, and baking the printed ink. Herein, the height of lines of the pattern is planarized by printing pressure, and the conductivity thereof can be provided by fusing Ag nanoparticles to the surface using a heat baking process or a microwave baking process/laser portion baking process.

Another example that may be used in the present invention is a gravure offset printing method. The gravure offset printing method can be performed by filling a paste into a patterned intaglio printing plate, transferring it to a blanket, and bringing the blanket into close contact with a transparent base material, thus transferring the paste to the base material. In addition, the gravure offset method may also be performed by winding a patterned blanket around a roll, filling a paste into the pattern of the blanket, and transferring the blanket to the transparent base material. In the invention, a combination of the above printing methods may also be used. In addition, a printing method (e.g., a screen printing method) known to those skilled in the art may also be used.

In one embodiment of the present invention, the printing method is not limited to the above printing method, and a photolithography process may also be used. For example, the photolithography process may be performed by forming a conductive pattern material layer on the entire surface of a transparent base material, forming a photoresist layer thereon, patterning the photoresist layer by selective exposure and development processes, patterning the conductive pattern material layer using the patterned photoresist layer as an etch resist, and removing the photoresist layer.

In one embodiment of the present invention, a photography method may also be used. For example, after a photosensitive material containing silver halide has been coated on the transparent base material, a pattern may be formed by selectively exposing and developing the photosensitive material. More specifically, a negative photosensitive material is applied to a base material on which a pattern is to be formed. In this regard, the base material may be a polymer film such as PET, acetyl celluloid or the. Herein, the polymer film material having the photosensitive material applied thereto will now be referred to as the film. The negative photosensitive material may be formed of silver halide obtained by adding a small amount of AgI to AgBr which is very sensitive and regularly responds to light. Because a image which is developed by photographing a general negative photosensitive material is a negative picture that is opposite to a subject in terms of light and shade, the photographing may be performed using the mask that has the pattern form to be formed, preferably an irregular pattern form.

In order to increase the electrical conductivity of the conductive pattern formed using the photolithography and photography processes, a plating process may further be performed. The plating may be performed using an electroless plating method, and copper or nickel may be used as the plating material. After the copper plating has been performed, nickel plating may be performed thereon. However, the scope of the present invention is not limited thereto.

In one embodiment of the present invention, a hard mask-based method may also be used. For example, the patterning process may be performed by depositing the conductive pattern material on the base material after placing a mask, which has the desired conductive pattern shape, close to the base material. In this case, the depositing process can be performed using a thermal deposition method with heat or electron beam, a PVD (physical vapor deposition) method such as sputtering, or a CVD (chemical vapor deposition) method with an organometal material.

In another embodiment of the invention, the conductive pattern of the present invention may also be fabricated using an imprinting process. The imprinting process may comprise: coating an imprintable resin on the base material having a conductive metal deposited thereon; printing it using a prepared mold pattern; dry-etching the conductive metal to form a metal line pattern; and removing the resin, or patterning a resin for imprinting by a mold. Alternatively, the conductive pattern may also be fabricated by patterning an imprinting resin using a mold to form resin patterns, and filling a conductive material between the resin patterns, and the filled conductive material may be used as the conductive pattern or may be transferred to another base material.

In one embodiment of the present invention, the transparent base material has a light transmittance of 50% or more, preferably 75% or more, and more preferably 88% or more, but is not limited thereto. Specifically, the transparent base material may be glass or a plastic substrate or film. The plastic substrate or film may be formed of a material well known in the art. For example, the plastic substrate or film may be formed of at least one resin selected from the group consisting of polyacryl, polyurethane, polyester, polyepoxy, polyolefine, polycarbonate, and cellulose. More preferably, it may be formed of a resin having a visible light transmittance of 80% or more, such as PET (polyethylene terephthalate), PVB (polyvinylbutyral), PEN (polyethylene naphthalate), PES (polyethersulfon), PC (polycarbonate), or acetyl celluloid.

The thickness of the plastic film is preferably 12.5-500 µm, more preferably 50-450 µm, and even more preferably 50-250 µm. The plastic substrate may comprise various functional layers, such as a gas barrier layer for blocking moisture and gas, a hard coat layer for enhancing strength, increasing transmittance and reducing Haze value, and an antiglare coating layer for preventing reflection, which are provided on one or both surfaces of the plastic film. The functional layer that can be included in the plastic substrate is not limited thereto, and various functional layers may be provided.

The conductive pattern may be formed directly on components (e.g., substrate) which are included in devices or apparatuses (such as displays) to which the conducting substrate of the present invention is to be applied.

In one embodiment of the present invention, the conductive pattern is preferably made of at least one selected from the group consisting of a metal, a metal alloy, metal oxide, metal nitride, and metal oxynitride, which have good electrical conductivity. Meanwhile, the resistivity of the conductive pattern material is preferably 1 µΩ cm or more and 100 µΩ cm or less, more preferably 1 µΩcm or more and 5 µΩcm or less. Specifically, the conductive pattern material may be at least one selected from the group consisting of aluminum, copper, silver, gold, iron, molybdenum, nickel, carbon nanotubes, titanium, alloys thereof, oxides thereof, nitrides thereof, and oxynitride thereof. Among these, aluminum is most preferable in view of cost and conductivity. The conductive pattern material can be used as particles when direct printing is carried out, and the particles may be made of the above-mentioned metals alone or in combination.

In one embodiment of the invention, when an ink or paste containing the conductive pattern material is used, the ink or paste may further include, in addition to conductive pattern material, an organic binder to facilitate the printing process. The organic binder is preferably a material which is volatilized in the baking process. Examples of the organic binder include, but are not limited to, polyacryl resin, polyurethane resin, polyester resin, polyolefine resin, polycarbonate resin, cellulose resin, polyimide resin, polyethylene naphthalate resins, and modified epoxy resin.

In the conducting substrate according to one embodiment of the invention, the conductive pattern may have an aperture ratio of 90 to 99.9% and a line width of 0.5 to 15 µm. In particular, the width of the lines forming the conductive pattern may have 0.5 to 3 µm, 3 to 5 µm, 5 to 7 µm, 7 to 10 µm, or 10 to 15 µm. In another embodiment of the invention, the conductive pattern may have an aperture ratio of 90 to 99.9% and a line width greater than 15 µm.

The distance interval between the lines of the conductive pattern may vary depending on the required transmittance or other required characteristics, but may be 1 mm or less. More specifically, it may be 0.1 to 0.5 mm, or 0.2 to 0.4 mm, or 0.2 to 0.3 mm.

When the distance between the lines of the conductive pattern is large, for example, 5 mm or more, it is important that the lines of the pattern is invisible when the conducting substrate is applied to the touch panel. In this case, since the pattern is not a fine pattern, no diffraction pattern will occur. However, when the distance between the lines of the conductive pattern is as short as 1 mm or less, it is important to reduce the intensity of diffraction patterns caused by external light. In a fine pattern, since the pattern line is not visible, the problem associated with masking of the pattern will not arise. According to one embodiment of the invention, it is possible to reduce the intensity of diffraction patterns caused by external light, in particular, the intensity of reflective diffraction patterns, because the surface of the conductive pattern has roughness. As a result, even when the distance between the lines of the conductive pattern is 1 mm or less, specifically 0.1 to 0.5 mm, 0.2 to 0.4 mm, or 0.2 to 0.3 mm, the intensity of diffraction patterns caused by external light can be reduced.

The height of the lines of the conductive pattern may be 0.01 to 10 µm. More particularly, the height of the lines of the conductive pattern may be 0.01 to 1 µm, 1 to 2 µm, 2 to 5 µm, or 5 to 10 µm. In one embodiment of the invention, the height of the lines of the conductive pattern may be greater than 10 µm, and can vary depending to conductivity. In one embodiment of the invention, the height of line and the height of line of the conductive pattern can be made uniform using the above-described methods. In the invention, the uniformity of the conductive pattern can be maintained at ±3 µm or less for the width of lines, and ±0.01 µm or less for the height of lines. The standard deviation of the height of lines in the conductive pattern is preferably 10% or less.

In the conducting substrate according to one embodiment of the invention, the conductive pattern includes metal pattern lines which cross each other, and the number of intersection points between metal pattern lines per unit area (cm$^2$) is preferably 5 to 10,000.

The conducting substrate according to one embodiment of the invention can be connected to a power supply, and the resistance value per unit area, determined considering the aperture ratio, is 0.01 ohm/square to 1,000 ohm/square, preferably 5 ohm/square to 150 ohm/square.

The conducting substrate according to one embodiment of the invention can be used to conduct current or apply voltage by external factors other than the construction of the conducting substrate itself. As one example, when the conducting substrate according to one embodiment of the invention is designed to correspond to the touch screen pattern and it is connected to an external power source, it can be used as a touch screen.

In the conducting substrate according to one embodiment of the invention, the aperture ratio of the conductive pattern, that is, the area ratio of the base material which is not covered by the pattern is preferably 70% or more, more preferably 90% or more, even more preferably 95% or more. In particular, the aperture ratio of the conductive pattern is preferably 90 to 99.9%, more preferably 95 to 99.9%.

The conducting substrate according to one embodiment of the invention may further comprise at least one selected from among a light absorption layer, an anti-reflection layer, a light diffusing layer (i.e., an antiglare layer), etc. on at least one surface, preferably a surface visible by user.

The light absorption layer is preferably disposed in contact with the conductive pattern. The light absorption layer is formed on the whole area of at least one surface on the conductive pattern so that it has the same pattern shape as the conductive pattern. However, the light absorption layer may be formed on at least a portion of at least one surface on the conductive pattern, or may be formed on the area greater than the pattern shape of the metal pattern.

The anti-reflection layer or the light diffusing layer may be formed to have a pattern shape formed on the whole area or at least a portion of at least one surface of the conductive pattern. However, the anti-reflection layer or the light diffusing layer may be formed to have the pattern shape including not only the area on which the metal pattern is formed, but also the area on which the metal pattern is not formed, or the whole area.

The conducting substrate according to one embodiment of the invention may further comprise a cover layer which is provided in contact with the adhesive layer on the conductive pattern. The cover layer may be formed of glass or plastic material.

One example of the conducting substrate according to one embodiment of the invention is shown in FIGS. 1 to 4. As shown in FIG. 1, the conducting substrate according to one embodiment of the invention comprises a base material (10), and a conductive pattern (20) on at least one surface of the base material (10), in which the surface of the conductive pattern (20) has the arithmetic average roughness height (Ra) of 0.1 to 0.3 µm.

Figure 2:
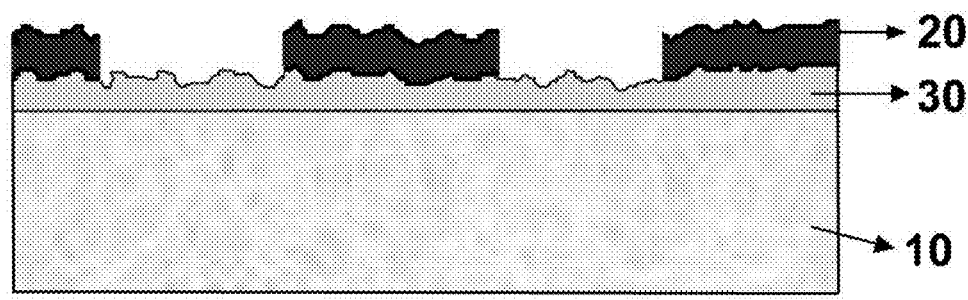

Also, as shown in FIG. 2, the conducting substrate according to one embodiment of the invention may further comprise a coating layer 30 such as an anti-reflection layer between the base material 10 and the conductive pattern 20. Herein, the surface of the coating layer 30 has an arithmetic average roughness height (Ra) of 0.1 to 0.3 µm.

Figure 3:
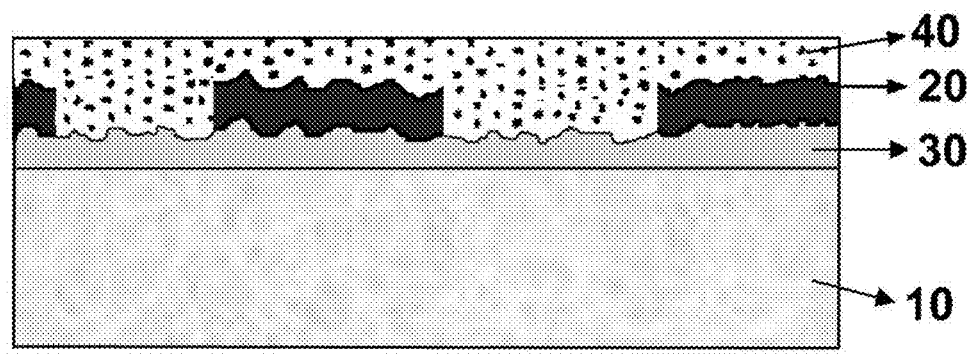

Also, as shown in FIG. 3, the conducting substrate according to one embodiment of the invention may further comprise an adhesive layer (40) on the conductive pattern (20). The adhesive layer (40) includes an OCA and may be formed so as to cover both the conductive pattern (20) and the coating layer (30). Thus, the roughness of the surface of the coating layer is filled with the adhesive layer (40). The interface between the coating layer and the conductive pattern has roughness, and the arithmetic average roughness height (Ra) of the interface between the coating layer and the conductive pattern may be 0.1 to 0.3 µm. Also, there exists roughness on the interface between the conductive pattern and the adhesive layer, and the arithmetic average roughness height (Ra) of the interface between the conductive pattern and the adhesive layer may be 0.1 to 0.3 µm.

Figure 4:
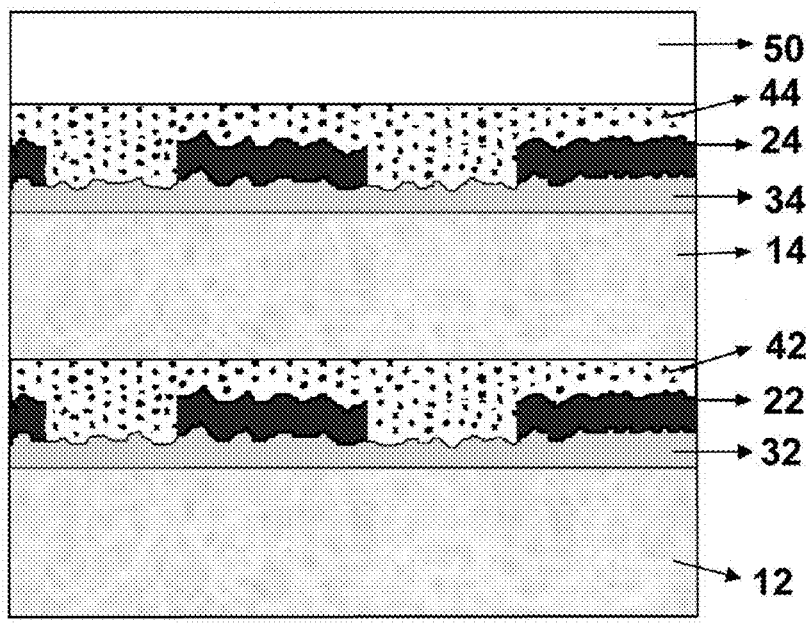

Moreover, as shown in FIG. 4, the conducting substrate according to one embodiment of the invention has a construction of first base material (12)/first coating layer (32)/first conductive pattern (22)/first adhesive layer (42)/second base material (14)/second coating layer (34)/second conductive pattern (24)/second adhesive layer (44)/cover glass layer (50).

According to one embodiment of the invention, the conducting substrate may be fabricated by forming a coating layer on the base material, the coating layer having an arithmetic average roughness height (Ra) of 0.1 to 0.3 µm, and forming a conductive pattern on the coating layer.

In particular, the coating layer is preferably an anti-reflection layer, but it is not limited thereto.

According to one embodiment of the invention, the conducting substrate may be fabricated by pre-treating a base material so as to have an arithmetic average roughness height (Ra) of 0.1 to 0.3 µm, and forming a conductive pattern on the base material. The pre-treatment of the surface of the base material can be performed by known techniques in the art, and the surface roughness of the base material can be controlled to a size of submicron by removing molecules from the surface.

According to one embodiment of the invention, there is provided a touch panel comprising the above-described conducting substrate. The touch panel according to the embodiment of the present invention comprises: a lower base material; an upper base material; an electrode layer provided on any one or both of the surface of the lower base material that comes into contact with the upper base material and the surface of the upper base material that comes into contact with the lower base material. The electrode layers can function to detect positions on the X-axis and the Y-axis, respectively.

According to one embodiment of the invention, one or both of the electrode layer, provided on the surface of the lower base material that comes into contact with the upper base material, and the electrode layer provided the surface of the upper base material that comes into contact with the lower base material, may be a conducting substrate according to one embodiment of the present invention. When only any one of the electrode layers is the conducting substrate based on one embodiment of the invention, the other one may have a pattern known in the art.

When the two electrode layers are formed on both the upper base material and the lower base material, an insulating layer or a spacer can be provided between the lower base material and the upper base material so as to maintaining the spacing the two layers and to prevent electrical connection between the two layers. The insulating layer is preferably made of an adhesive, a UV-curing resin or thermosetting resin. The touch panel may further comprise a ground member connected to the conductive pattern. The ground member can be formed at an edge of the surface on which the conductive pattern is formed. Also, at least one of an anti-reflection film, a polarizing film, and a fingerprint resistance film can be provided on at least one surface of a laminated material comprising the conductive pattern. Depending on the design specification, the touch panel may further comprise functional films other than the above-described functional films. Such a touch panel can be applied to display apparatuses such as an organic light-emitting diode (OLED) display panel, a liquid crystal display (LCD), a cathode-ray tube (CRT), and a plasma display panel (PDP).

The touch panel may have a Haze value of 10% or less, and a conductivity of 75% or more. More particularly, the touch panel has a Haze value of 10% or less and a conductivity of 75% or more, preferably a Haze value of 5% or less and a conductivity of 85% or more, more preferably a Haze value of 2% or less and a conductivity of 90% or more.

Hereinafter, the present invention will be described in further detail with reference to examples. It is to be understood, however, that these examples are for illustrative purposes only and are not intended to limit the scope of the present invention.

[Comparative Example]

Al for providing conductivity was deposited on PET (125 micrometer/SKC) to a thickness of 200 nm by a sputtering process. Then, a conducting substrate having a conductive metal pattern was produced by a patterning process. The surface roughness (Ra) of the conducting substrate was measured to be 0.03 μm.

Also, a GFF type of a touch panel laminated structure (cover glass (G)/OCA/conducting substrate film (F)/OCA/ conducting substrate film (F)) was fabricated using the conducting substrate. Then, the touch panel was placed in a system equipped with diffuser and a CCD camera such that laser (532 nm, green)-incident or reflective or transmission-type diffraction patterns could be observed, and the observation of diffraction patterns was carried out. In Comparative Example, the reflection- and transmission-type diffraction patterns were clearly observed.

[Example]

Figure 5:
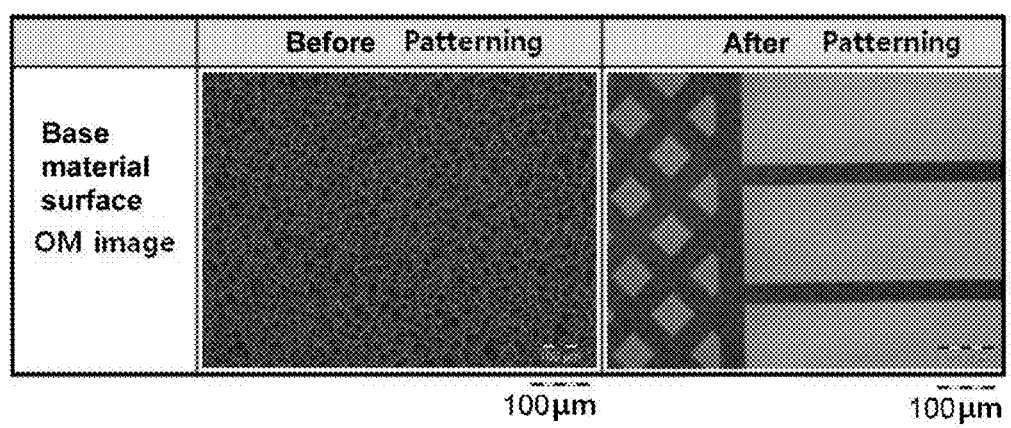
FIG. 5 shows a conducting substrate according to one embodiment of the present invention, in which the conducting substrate comprises a conductive metal layer, formed on a base material by sputtering, and a conductive metal pattern formed by pattering the conductive metal layer.

After an anti-reflection layer (transmission: 91%, Haze: 28%, surface roughness: 0.24 μm) having a dry thickness of 10 μm was formed on PET (125 micrometer/SKC) by a bar coating method, Al for providing conductivity was deposited on the anti-reflection layer to a thickness of 200 nm by a sputtering process. Then, a patterning process was performed to form a conductive metal pattern. FIG. 5 shows a conductive metal layer, formed on a base material by sputtering, and a conductive pattern formed by patterning the conductive metal layer.

Figure 7:
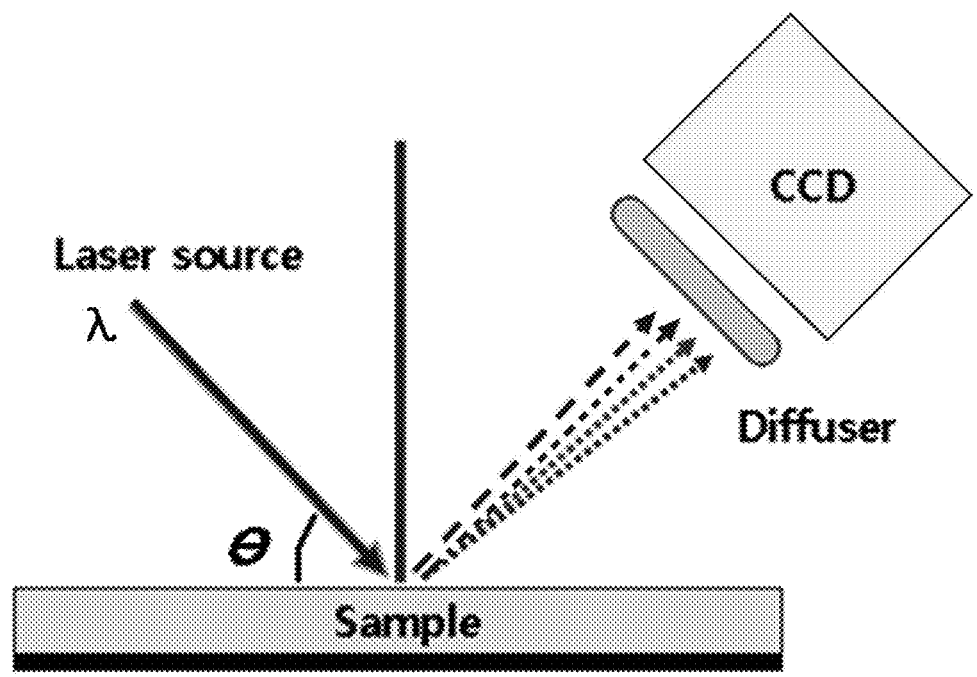
FIG. 7 shows a system designed for measuring a diffraction pattern.

Also, after forming the touch panel having a GFF type of laminated structure, the reflection and transmission type diffraction patterns were observed by the same system. As a result, there was no significant difference in the intensity of transmission-type diffraction patterns between Comparative Example and Example, but there was a clear decrease in the intensity of reflection-type diffraction in the case of Example. FIG. 7 shows an apparatus designed to compare the intensity of diffraction patterns. The observation of diffraction patterns was performed in the following manner. When a green laser having a wavelength of 532 nm was incident and the light reflected through the sample was passed the diffuser to form an image, the image was photographed by the CCD camera. The observed results are shown in FIG. 6.

As described above, in the conducting substrate according to the embodiment of the present invention and the touch panel comprising the same, diffuse reflection can be induced by controlling the surface roughness of the conductive pattern. Thus, the conducting substrate of the present invention does not obstruct the view, has excellent electrical conductivity, and can reduce the intensity of diffraction patterns caused by reflected light. Moreover, the conductive pattern according to the embodiment of the invention can be formed by various methods, such as a printing method, a photolithography method, a photography method, a hard mask-based method, a sputtering method, an ink jet imprinting method or an imprinting method, after predetermining a desired pattern. Thus, it can be formed by an easy process in a cost-effective manner. In addition, when the conductive pattern according to the embodiment of the present invention is used, the irregularity and light transmittance thereof can be controlled by artificially irregularities and pitches during the design thereof. In addition, even though the conductive pattern according to the present invention is an irregular pattern, the density of lines in the conductive pattern of the present invention is similar to that of a regular pattern having uniform pitches, making it possible to ensure electrical uniformity similar to the regular pattern.

DESCRIPTION OF REFERENCE NUMERALS

10: Base material
12: First base material
14: Second base material
20: Conductive pattern
22: First conductive pattern
24: Second conductive pattern
30: Coating layer
32: First coating layer
34: Second coating layer
40: Adhesive layer
42: First adhesive layer
44: Second adhesive layer
50: Cover glass layer

The invention claimed is:

1. A conducting substrate comprising:
at least one base material; and
at least one conductive pattern provided on the at least one base material;
wherein a surface of the at least one conductive pattern has an arithmetic average roughness height (Ra) of 0.1-0.3 μm,
wherein the conducting substrate further comprises a coating layer between the at least one base material and the at least one conductive pattern,
wherein a surface of the coating layer has an arithmetic average roughness height (Ra) of 0.1-0.3 μm,
wherein the at least one conductive pattern comprises lines,
wherein a width of lines in the at least one conductive pattern is 0.5 to 15 μm,
wherein the at least one conductive pattern includes a metal or a metal alloy,
wherein the conducting substrate further comprises an adhesive layer on the at least one conductive pattern, such that the at least one conductive pattern is between the adhesive layer and the coating layer, and the adhesive layer covers the coating layer and the at least one conductive pattern, and
wherein a difference in refractive index between the adhesive layer and the coating layer is 0.2 or less.

2. The conducting substrate according to claim 1,
wherein the at least one base material comprises a first base material and a second base material; and
wherein the at least one conductive pattern comprises a first conductive pattern and a second conductive pattern, the first conductive pattern is on the first base material, the second base material is on the first conductive pattern, and the second conductive pattern is on the second base material.

3. The conducting substrate according to claim 1,
wherein an interface between the coating layer and the conductive pattern has an arithmetic average roughness height (Ra) of 0.1-0.3 μm.

4. The conducting substrate according to claim 1, wherein the coating layer is an anti-reflection layer.

5. The conducting substrate according to claim 1, wherein the adhesive layer includes an optical clear adhesive (OCA).

6. The conducting substrate according to claim 1, wherein the adhesive layer matches the concave and convex portion of the surface of the coating layer that is at the interface between the adhesive layer and the coating layer.

7. The conducting substrate according to claim 1, wherein an interface between the coating layer and the at least one conductive pattern has an arithmetic average roughness height (Ra) of 0.1-0.3 μm, and
an interface between the at least one conductive pattern and the adhesive layer has an arithmetic average roughness height (Ra) of 0.1-0.3 μm.

8. The conducting substrate according to claim 1, wherein a distance between lines in the at least one conductive pattern is 1 mm or less.

9. The conducting substrate according to claim 1, wherein a distance between lines in the at least one conductive pattern is 0.1-0.5 mm.

10. The conducting substrate according to claim 1, wherein a height of lines in the at least one conductive pattern is 0.01-10 μm.

11. The conducting substrate according to claim 1, wherein the at least one conductive pattern has an aperture ratio of 90 to 99.5%.

12. The conducting substrate according to claim 1, wherein the at least one conductive pattern includes at least one selected from the group consisting of aluminum, copper, silver, gold, iron, molybdenum, nickel, titanium, and alloys thereof.

13. The conducting substrate according to claim 1, wherein the arithmetic average roughness height (Ra) of the at least one base material is 0.1-0.3 μm.

14. The conducting substrate according to claim 1, wherein the conducting substrate further comprises at least one selected from the group consisting of a light absorption layer and a light diffusing layer on the at least one conductive pattern.

15. The conducting substrate according to claim 1, wherein the conducting substrate further comprises a cover layer that is in contact with the adhesive layer.

16. The conducting substrate according to claim 15, wherein the cover layer is formed of glass or plastic material.

17. A touch panel comprising the conducting substrate of claim 1.

18. The touch panel according to claim 17, wherein the touch panel has a Haze value of 10% or less and a transmittance of 75% or more.

* * * * *